US 6,581,086 B1

(12) United States Patent
Morrison et al.

(10) Patent No.: US 6,581,086 B1
(45) Date of Patent: Jun. 17, 2003

(54) MULTIPLY AND ACCUMULATE UNIT (MAC) AND METHOD THEREFOR

(75) Inventors: Gary R. Morrison, Austin, TX (US); Charles Edward Nuckolls, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/488,366

(22) Filed: Jan. 18, 2000

Related U.S. Application Data

(63) Continuation-in-part of application No. 09/426,009, filed on Oct. 25, 1999, now Pat. No. 6,421,744.

(51) Int. Cl.[7] ................................................ G06F 7/38
(52) U.S. Cl. ................................................... 708/523
(58) Field of Search ................................ 708/523, 501, 708/620, 625

(56) References Cited

U.S. PATENT DOCUMENTS

| 5,623,683 A | * | 4/1997 | Pandya ...................... 708/523 |
| 5,644,519 A | * | 7/1997 | Yatim et al. ................ 708/523 |
| 6,233,596 B1 | * | 5/2001 | Kubota et al. .............. 708/523 |
| 6,314,443 B1 | * | 11/2001 | Seal ........................... 708/523 |

* cited by examiner

Primary Examiner—Tan V. Mai
(74) Attorney, Agent, or Firm—James L. Clingan, Jr.

(57) ABSTRACT

A multiply and accumulate (MAC) unit (52) having a multiplier (54) and an adder (56) for providing a calculated result of a MAC operation, an accumulator (58) for storing the calculated result, and a scaler unit (60) for selecting a subset of the calculated result stored in the accumulator. The scaler unit receives information defining the subset as a predetermined number of contiguous bits and defining the location of the bits with respect to a radix point. In response to a detected error in the selection of the subset, the scaler unit selects a second subset, where the second subset also has a predetermined number of contiguous bits having a different location with respect to the radix point:

8 Claims, 8 Drawing Sheets

MULTIPLY AND ACCUMULATE UNIT (MAC) AND METHOD THEREFOR

RELATED APPLICATIONS

This is a Continuation-in-part of Ser. No. 09/426,009, filed Oct. 25, 1999, now U.S. Pat. No. 6,421,744.

This is a continuation-in-part (CIP) of U.S. Patent Application by Gary Morrison, et al., having U.S. Pat. No. 6,421,744 and assigned to the assignee hereof.

This application is related to a co-pending patent application entitled "METHOD FOR AN EXECUTION UNIT INTERFACE PROTOCOL AND APPARATUS THEREFOR" by Frank Galloway, et al., having Ser. No. 09/488,363 filed concurrently herewith and assigned to the assignee hereof.

FIELD OF THE INVENTION

The present invention relates to multiply and accumulate units, and specifically to accuracy and precision balancing of results from a multiply and accumulate unit.

BACKGROUND OF THE INVENTION

As data processing systems are required to process increasing amounts of information and perform a variety of operations on data, coprocessors are often added to perform specific functions. In video and audio applications the data is compressed and/or decompressed to improve the throughput of the transmission system. These systems require arithmetic and logical operation capability as well as more complex operations to accommodate compression, modulation, demodulation, etc. Typically, these functions are performed using software or some dedicated hardware.

Many of the more complicated operations result in data rate distortion. For example, when input data is compressed, the amount of output data that will result from a given input data stream is often not determinable. Data rate distortion adds to the flexiblity of the data processing system and is a requirement of most systems that process video, audio and communication information.

Software routines provide a flexible, convenient method of processing information, but also introduce latency into the systems, as typically many cycles are required to perform each of the various algorithms. Hardware solutions are less flexible, but provide a faster computation. Hardware and coprocessors typically have an input/output (I/O) bus for communication with the main processor, such as a central processing unit (CPU), and the rest of the data processing system. The I/O bus prevents the coprocessor from simultaneously receiving data while outputting data to the data processing system. This prevents these coprocessors from pipelining instructions where instructions are received while others are processed.

With respect to execution units that perform multiply and accumulate functions, such as a multiply and accumulate unit (MAC), a series of operands are multiplied and the product of each multiplication is added to previous results. In a fixed-point operation using fractional representations, the operands are fractions and therefore the product of a multiplication is always less than one (1), and are therefore always to the right of the radix point. In contrast, the sum of an addition may exceed one (1) and may in fact become quite large. The sum of the addition may be scaled to balance bit-length with precision, i.e. more bits increase the precision but require more storage and calculation capability. If a predetermined number of bits are allowed for further processing, where the predetermined number of bits is less than the total number of bits in the addition sum, each significant bit to the left of the radix point reduces the number of bits allowed to the right of the radix point. In this case, the scaling maintains accuracy while sacrificing precision.

Typically, scaling involves determining a predetermined range of values within which the sum of each addition is to fall. The number of bits allowed to the right and left of the radix point is determined by the user in advance to actual processing according to the predetermined range of values. When the sum of an addition is outside the predetermined range of values, the predetermined range of values must be adjusted. Often the predetermined range is an estimate of where the results should fall, and actual data may not follow the estimate. In such a case the range is adjusted and calculations from this point on use the new range. A problem exists in the current calculation, as the result of a MAC operation is the final result of multiple accumulations, i.e. iterations of the MAC unit, and the accumulations before the error where scaled by a first factor while those after the error are scaled by a second factor. The prior art solution is to perform the entire MAC operation a second time using the second, or adjusted, range. This increases the operation time of the MAC unit, and may cause delays in pipelined operations.

Therefore, there is a need for a method of scaling results from a MAC unit that reduces the time required to correct the result and adjust the scaling factor. Additionally, a need exists for a method of identifying overflows in the MAC unit calculations to prevent further errors from propagating through the data processing system without requiring recalculation of operations already performed.

BREIF DESCRIPTION OF THE DRAWINGS

The present invention may be more fully understood by a description of certain preferred embodiments in conjunction with the attached drawings in which.

DETAILED DESCRIPTION OF THE PREFERRED EMBODIMENTS

For clarity the terms assertion and negation are used herein to avoid confusion regarding "active-low" and "active-high" signals. The term assert or assertion is used to indicate that a signal is active or true, independent of whether that level is represented by a high or a low voltage. The term negate or negation is used to indicate that a signal is inactive or false.

In one aspect of the present invention, in a data processing system having a processor, a memory coupled to the processor, and a multiply/accumulate (MAC) unit, the MAC unit including an accumulator, a method for operating said MAC unit includes the steps of storing a result of a plurality of MAC operations in the accumulator wherein the plurality of MAC operations is a step in an algorithm; selecting a first subset of the result wherein the first subset of the result includes a predetermined number of contiguous bits, the first subset of the result defining a first subset value; storing the first subset value in the memory; detecting an overflow in the first subset of the result; retrieving the result from the accumulator; and selecting a second subset of the result different from the first subset of the result wherein the second subset includes the same predetermined number of contiguous bits as the first subset of the result, the second subset of the result defining a second subset value.

Figure 1:
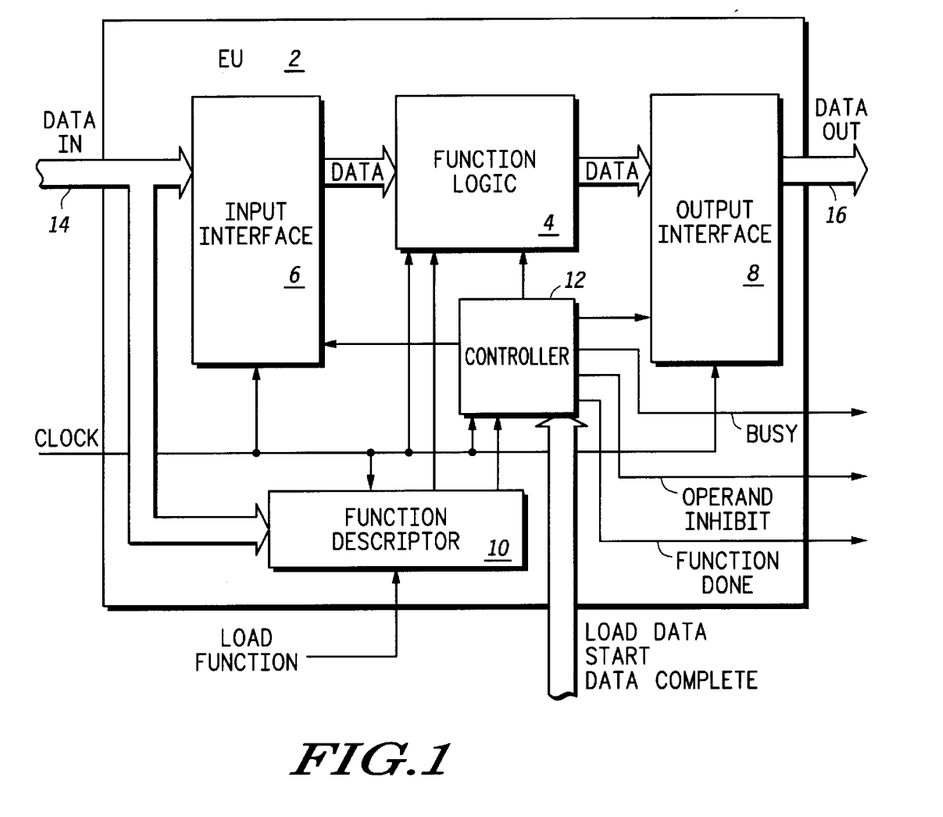
FIG. 1 illustrate, in block diagram form, an execution unit according to one embodiment of the present invention.

FIG. 1 illustrates an execution unit 2 in accordance with one embodiment of the present invention. The execution unit 2 includes a function logic unit 4, an input interface unit 6, an output interface unit 8, a function descriptor unit 10 and a controller 12. A clock signal is provided to the input interface unit 6, the function logic unit 4, the output interface unit 8, and the controller 12. Data in is provided via Data In Bus 14, where data information is provided to the input interface unit 6 from external to the execution unit 2. The data information is digital information and may include but not be limited to such things as audio or video information provided in a data stream, a characters in a data file to be compressed, and/or data from a mass storage device, etc. The input interface unit 6 receives the data information, and provides the data to the function logic unit 4 according to control signals generated within the execution unit 2. Alternate embodiments may provide control signals directly to the input interface unit 6 from external to the execution unit 2.

The function logic unit 4 output is provided to the output interface unit 8 which then outputs the data information on Data Out Bus 16. The output interface unit 8 holds the data received from the function logic unit 4 until it is ready to be sampled external to the execution unit 2.

The function logic unit 4 may be any functional unit that processes data, including but not limited to an arithmetic unit, a logical unit, a multiply/accumulate (MAC) unit, a compression/decompression engine, a cyclic redundancy check (CRC) engine, etc. The controller 12 is coupled to the function logic unit 4, the input interface unit 6, and the output interface unit 8 to provide control signals and information for processing data. The controller 12 receives function information from the function descriptor unit 10, where the function information indicates the function to be performed by the execution unit 2. In one embodiment, the function descriptor unit 10 is a register storing the function descriptor.

The controller 12 also receives several control signals from external to the execution unit 2, including but not limited to a load data signal, a start signal, and a data complete signal. The load data signal indicates that data is ready to be input into the execution unit 2. The start signal indicates that the execution unit 2 has received a portion of data. In response to the start signal, the function logic unit 4 performs the designated function on the portion of data. In some situations the function logic unit 4 doesn't wait for the start signal to begin processing data, such as where the function logic unit 4 is accumulating an undetermined amount of data and the function logic unit 4 begins accumulating without respect to the start signal for each portion of data. Note that a portion may be one datum or some integral unit of data.

Basically, the start signal indicates that the function logic unit 4 has received sufficient data to perform the designated function. The data complete signal indicates that a block of data is complete, where a stream of data is provided to the function logic unit 4 and the function logic unit 4 performs the designated function on portions of the block of data. An example of a block of data is a stream of data for compression, where the designated function is to compress data. The data complete signal is asserted when the block of data is finished.

The controller 12 may be a state machine or other controller circuitry for controlling the operation of the execution unit 2. In response to the control signal(s) and the function descriptor information, the controller 12 generates control signal(s) to the input interface unit 6 to provide data to the function logic unit 4. Similarly, the controller 12 provides control information to the function logic unit 4 to set up and initiate the designated function. When the result is ready to be output, the controller 12 generates control signal(s) to the output interface unit 8 indicating that data is to be output.

During processing, the controller 12 outputs a busy signal indicating that the execution unit 2 is currently executing. The controller 12 outputs a function done signal indicating that the designated function has completed. For example, where the function designated by the function descriptor unit 10 is an ADD function, the function done signal is asserted when the ADD has received its inputs, ADDed them together and is ready to provide the result. The controller 12 similarly generates an operand inhibit signal indicating that the function logic unit 4 is still processing information and the execution unit 2 is not ready to receive new inputs.

The execution unit 2 illustrated in FIG. 1 allows for data flow-through where the desired function is specified by initially designating the function of the function logic unit 4, and data then flows through the execution unit 2 and is processed according to the designated function. The function of the execution unit 2 only changes when a new function is loaded into the function descriptor unit 10. The present invention allows for the data flow-through without requiring the specification of a function for each new data or datum.

The present invention further allows for pipelining of function execution, where data is received while previous data is still processing. As illustrated in FIG. 1, data may be input into the input interface unit 6 while previous data is processing in the function logic unit 4, and the result of even earlier processed data is waiting in the output interface unit 8 to be output.

The present invention, as illustrated in FIG. 1, provides a dichotomy of address and data information, where the data processing system external to the execution unit 2 operates on address information without regard to the specific data associated with that address information, and the execution unit 2 operates on the data information without regard to the address information.

In an alternate embodiment, load function may provide a function number, where functions are each assigned a predetermined code, and the function number is that code. The function number then indicates the designated function for the function logic unit 4. In this case the function descriptors are preloaded internally within the execution unit 2, and the function is identified by the function number and without the need to load the function descriptor in the function descriptor unit 10. The execution unit 2 outputs a function internal signal indicating whether the functions are stored internally and may be accessed by the function number or whether the function must be loaded.

Additionally, in one embodiment a load constant signal is input into the execution unit 2 to identify a constant operand, in this case the data flow-though execution unit 2 has a fixed operand. As an example, such as a multiplier used in an amplifying application. In this case, the data is multiplied, but one multiplicand is a constant and the data is applied as the other multiplicand. This saves operation time as the execution unit 2 does not have to reload the constant value.

In another embodiment, the execution unit 2 examines the operands presented and if there is an error detected, such as insufficient data or data of a different form, generates a function fail signal instead of the function done signal.

Figure 2:
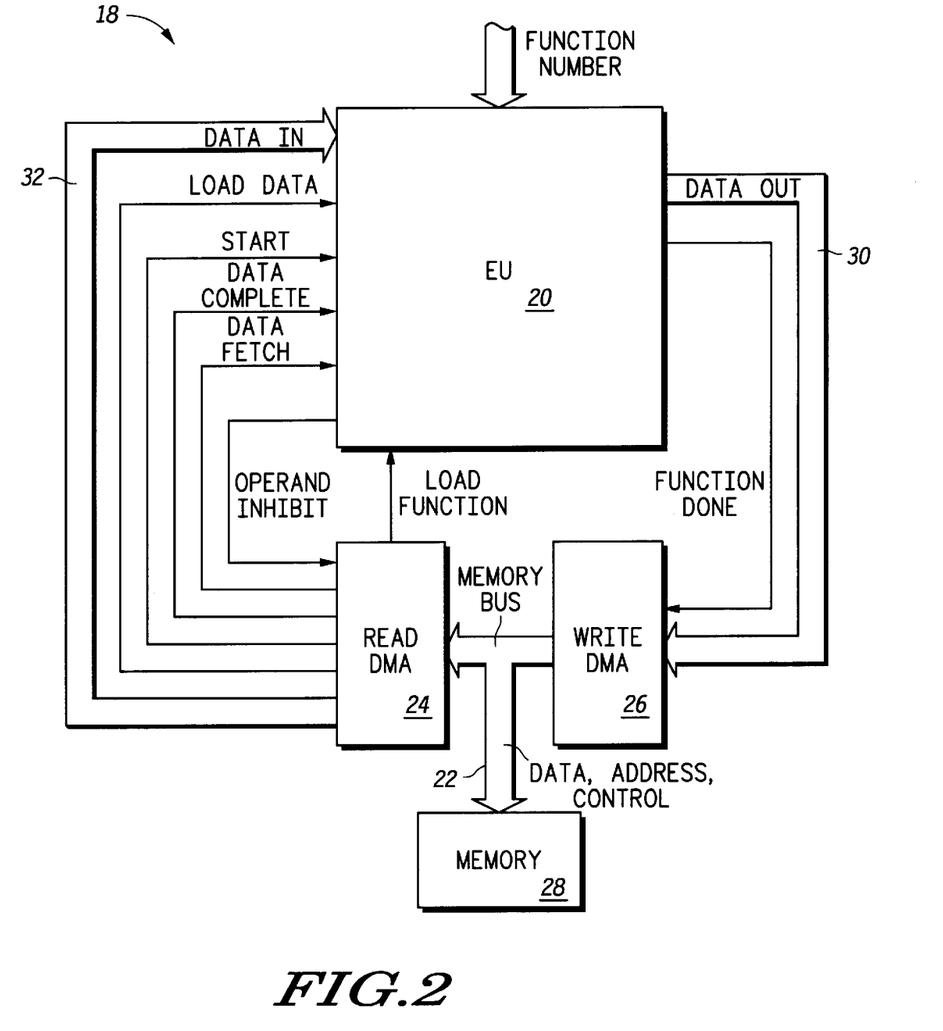
FIG. 2 illustrates, in block diagram form, a data processing system having an execution unit as in FIG. 1, in accordance with one embodiment of the present invention.

FIG. 2 illustrates a data processing system 18 according to one embodiment of the present invention. An execution unit 20 similar to execution unit 2 of FIG. 1 performs a plurality of functions. Within the data processing system 18, memory bus 22 is coupled to a read DMAC 24, a write DMAC 26, and a memory 28. Address, data, and control information are communicated within the data processing system 18 via the memory bus 22.

Data is provided as output from the execution unit 20 to the write DMAC 26 via Data Out Bus 30. Data is provided as input from the read DMAC 24 to the execution unit 20 via Data In Bus 32. A function number is provided to the execution unit 20 to designate a function for operation. The function number may be generated by a processor or by the read DMAC 24. The data processing system 18 operates according to the timing scenarios illustrated in FIGS. 3–6. The load function signal is generated by the read DMAC 24. The function done signal is provided by the execution unit 20 to the write DMAC 26. The operand inhibit signal is generated by the execution unit 20 to the read DMAC 24. The start, data complete, and load data signals are provided by the read DMAC 24. Note that in an alternate embodiment, DMA units are replaced with a processor.

FIGS. 3–6 illustrate various timing scenarios associated with the operation of the execution unit 2 according to the present invention. The signals indicated in the timing diagrams are located within data processing system 18 of FIG. 2. In each of these illustrations, the horizontal axis represents time and the vertical axis represents various signals used and/or generated by the execution unit 2. A clock signal is provided and odd cycles are indicated at the top of each figure. The load data signal and data fetch signals are active low signals; all the other signals are active high signals.

Figure 3:
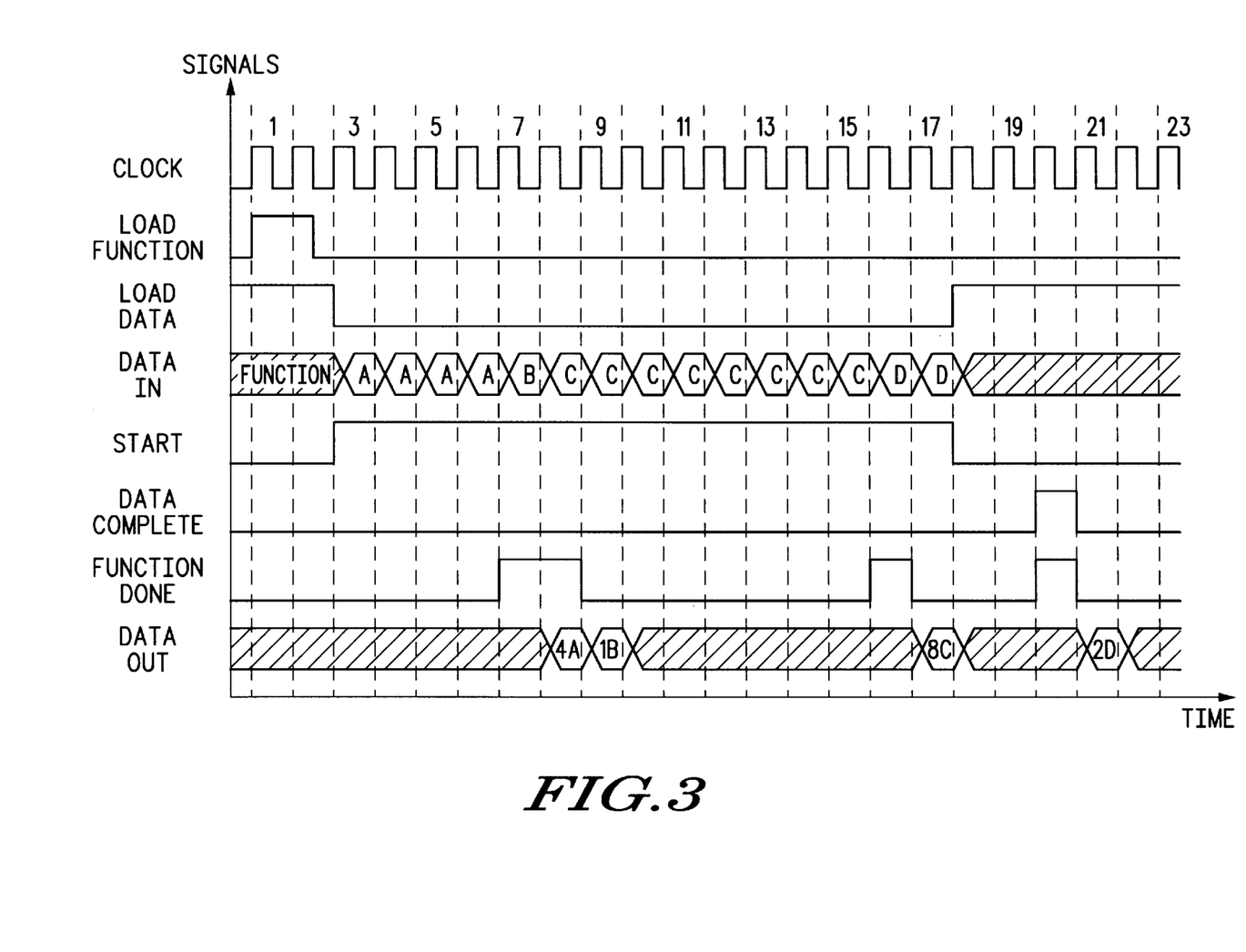
FIGS. 3–6 illustrate, in timing diagram form, operation of an execution unit as in FIG. 1.

FIG. 3 illustrates an example of data compression using the execution unit 2, where 4 bit data values are received and 8 bit data values are output. The upper 4 bits of the output represent the number of times one 4 bit data value is received successively. The lower 4 bits of the output represent the data value. The load function signal is asserted prior to the rising edge of the clock signal on cycle 2. While the load function signal is asserted the Data In provides the function descriptor of the next function. The function descriptor is loaded into the function descriptor unit 10. Note that in this example, the data values, A, B, C and D, represent hexadecimal values.

The load data signal is asserted before the rising edge of the clock on cycle 4 indicating that data is valid. Simultaneously the start signal asserts and the first piece of data "A" is valid during cycle 3. The load data signal stays asserted and data will continue to be valid until the load data signal is negated. Here successive data values are valid, one per clock cycle. The data for the designated function is input continuously and therefore the start signal remains asserted. At cycle 7 the execution unit 2 notices that the data has changed from "A" to "B" and in response the execution unit 2 asserts the function done signal. In the following clock cycle, the execution unit 2 drives the value "4A" as output on cycle 8, where the "A" identifies the data value and the "4" identifies the number of successive occurrences.

At cycle 8 the execution unit 2 notices that the data has changed from "B" to "C" and in response continues to assert the function done signal. On cycle 9 the execution unit 2 outputs a "1B" indicating one occurrence of the data value "B." Once the data changes to "C" the function done is negated on cycle 9. The function done signal precedes valid data. Data values of "C" are tallied until cycle 16 when the data value changes to "D." In response to the change, the function done is asserted and the tallied result output. This process continues until the last datum is input into the execution unit 2, as illustrated at cycle 18. At this point, the load data signal negates, and the start signal negates indicating the end of the data stream. On cycle 20 the data complete asserts indicating the execution unit 2 is to output any accumulated information that has not been output. At this point the execution unit 2 outputs "2D" on cycle 21.

Figure 4:
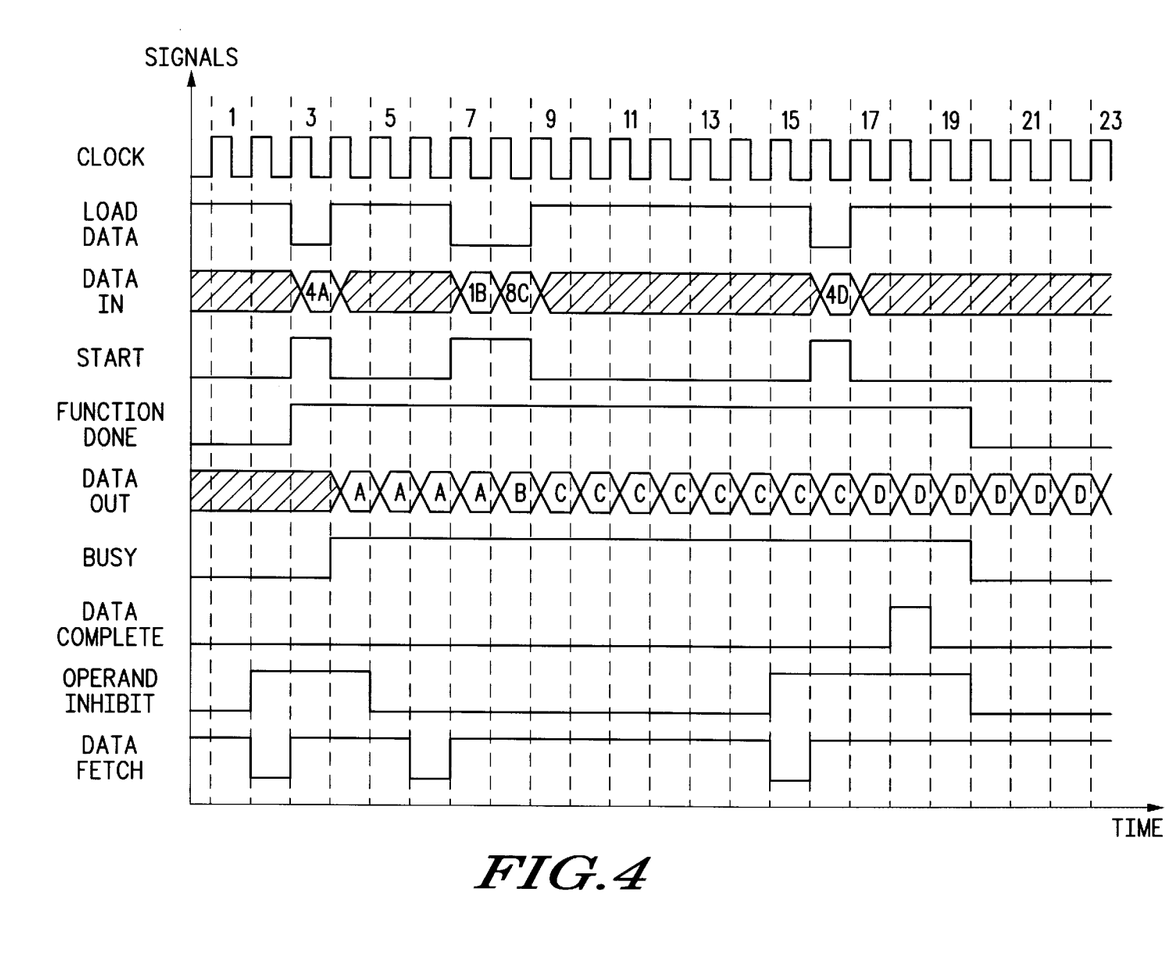

In FIG. 4, a decompression function is illustrated. The decompression function is opposite to the compression function, where the data input is the compressed value and the data output is the uncompressed data. As illustrated in FIG. 4, the first Data In is "4A" and the corresponding output is "AAAA." As illustrated, the data complete signal is asserted between clocks 17 and 19, indicating that the last Data In "4D" completes the data for this function. The execution unit 2 asserts an operand inhibit signal between clocks 2 and 4 to indicate that it can receive no further data, as in cases where the pipeline is full. Similarly, the execution unit 2 asserts the operand inhibit signal again between clocks 15 and 19. Note that the operand inhibit signal may indicate that the pipeline is full and therefore the execution unit is not ready to receive more data, and also may indicate that the execution unit has no more data to output. Also illustrated in FIG. 4 is a busy signal output from the execution unit 2 indicating that the execution unit 2 is busy as it currently executing. The execution unit 2 asserts the busy signal.

Figure 5:
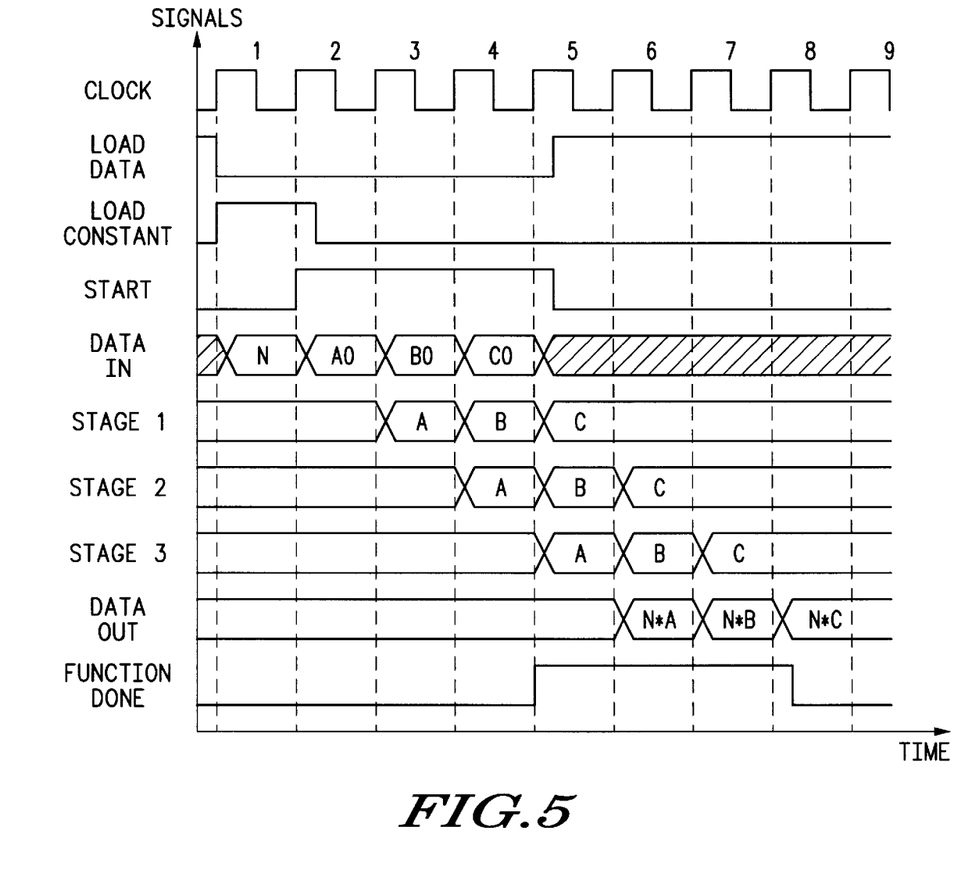

FIG. 5 illustrates operation of the execution unit 2 of FIG. 1 where a multiply accumulate (MAC) function is designated for the function logic unit 4. FIG. 4 provides an exemple of the pipelining of operations according to the present invention. The load data signal is asserted during clock cycle 1. In this case the data A0, B0, and C0 are multiplied by a constant value, N, so the load constant signal is asserted during clock cycle 1. The constant N is provided as Data In during the first clock cycle. During clock cycles 2, 3, and 4, the data A0, B0, and C0 are input, respectively. The multiplication process takes four (4) clocks to complete, where each stage performs successive steps in the process. Stage 1 of the function logic unit 4 processes A0 data during clock cycle 3 and stage 2 processes A0 data during clock cycle 4. Stage 1 processes B0 data during clock cycle 4 and processes C0 data at clock cycle 5. Stage 2 processes B0 data during clock cycle 5 and processes C0 data during clock cycle 6.

Note that concurrently with stage 2 processing of A0 data, stage 1 is processing B0 data. Similarly, with stage 2 processing of B0 data, stage 1 is processing C0 data. The data is output on successive clock cycles 6, 7 and 8 for each result A, B and C, respectively. In this way the execution unit 2 does not need to wait for all stages of operation to complete before receiving new data. The execution unit 2 of the present invention allows pipelining of functions reducing the time required to process multiple data. The function done signal is asserted during cycle 5 initiating the output of Data In the following clock cycles 6, 7 and 8.

Figure 6:
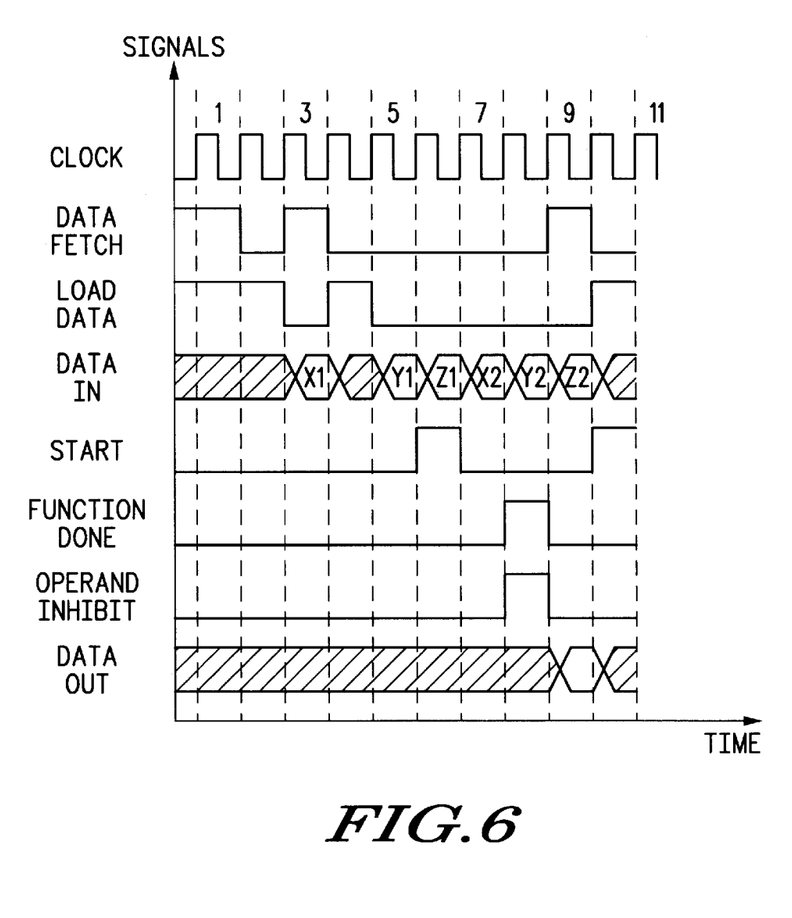

FIG. 6 illustrates data rate distortion using the execution unit 2. A data fetch signal indicates the initiation of a data fetch, and a load data signal indicates the data is ready as input. The data fetch signal and the load data signal are both active low signals. Assertion of the data fetch signal in clock cycle 2 begins the operand transfer. The load data is asserted in clock cycle 3 and data is valid during cycle 3. The data fetch is asserted in clock cycles 4 through 8. The load data signal is asserted cycles 5 through 9. Data is valid for cycles 5 through 9.

In this case it is possible to prevent a new read access by asserting an operand inhibit signal before the data fetch signal is asserted for that access. The function code indicates the function of the execution unit 2. The function descriptor therefore indicates the number of operands expected for this function. The operand inhibit signal prevents further data fetches after the data fetch of the final operand for this iteration of the function. The operand inhibit acts as a hold on that function to prevent further data fetches. In one embodiment, the operand inhibit must be asserted with the data fetch of the final operand.

As illustrated in FIG. 6, the operand inhibit signal is asserted in clock cycle 8, during the fetch of the final operand, "Z2." Assertion of the operand inhibit signal forces the data fetch of cycle 9 to negate. The data fetch signal asserts at clock 10. While the operand inhibit signal is asserted the execution unit 2 is prevented from receiving further data. The operand inhibit signal is negated in cycle 9.

Figure 7:
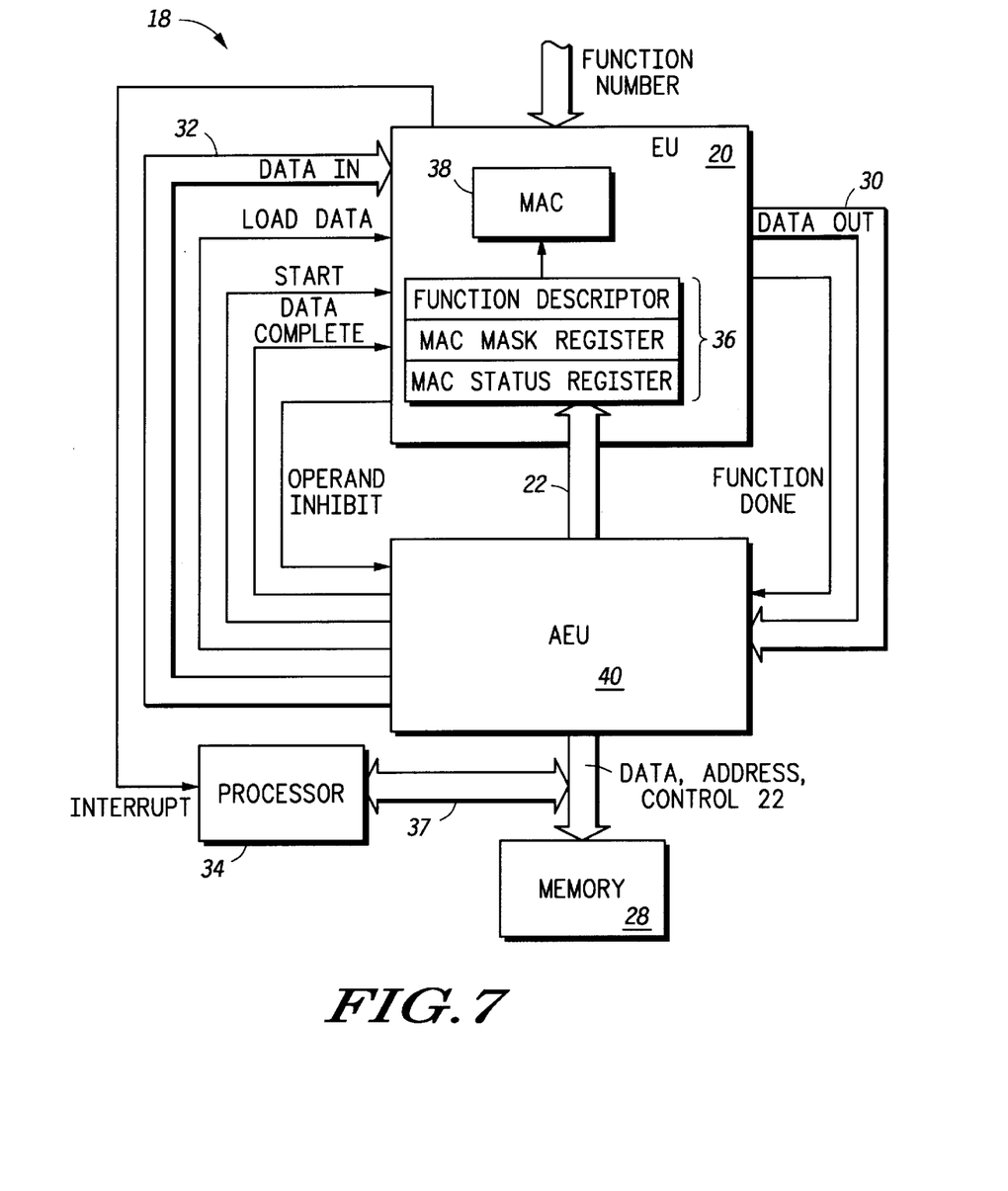
FIG. 7 illustrates, in block diagram form, a data processing systems, having an execution unit as in FIG. 1, in accordance with one embodiment of the present invention.

FIG. 7 illustrates an alternate embodiment of the data processing system 18 of FIG. 2, where the execution unit 20 is a multiply and accumulate unit. A processor 34 is illustrated, coupled to memory bus 22. Note that in this embodiment, the memory bus 22 is also coupled to the execution unit 20. The execution unit 20 includes multiple registers 36 used to store control and status information relating to the operation to be performed by MAC unit 38. The MAC unit 38 includes circuitry to perform multiplication, addition, and accumulation operations, and is further detailed in the alternate embodiments of FIGS. 8 and 9. The registers 36 include a first register to store a function descriptor to identify a predetermined range of acceptable MAC result values. A second register stores status information for the MAC unit 38, and is further detailed in FIG. 10. A third register stores control information for the MAC unit 38, and is further detailed in FIG. 11. The processor 34 may access the registers 36 via the memory bus 22, and receives an interrupt signal from the execution unit 20. The algorithmic execution unit, AEU 40, replaces the read DMAC 24 and the write DMAC 26 of FIG. 2.

Figure 8:
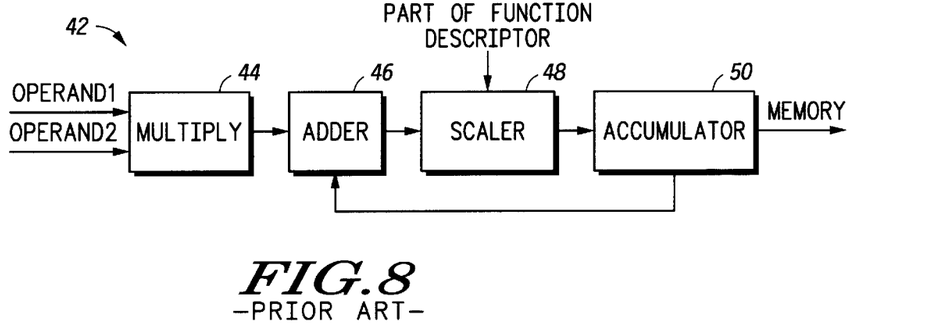
FIG. 8 illustrates, in block diagram form, a prior art multiply and accumulate (MAC) unit.

FIG. 8 illustrates a prior art MAC unit 42 having a multiply unit 44, and adder 46, a scaler 48, and an accumulator 50. The accumulator 50 may be a register or other memory storage location. The accumulator is larger than any individual operand. Operands are provided to the multiply unit 44, which outputs the product of the operands to the adder 46. The adder 46 performs an addition of the received product with a previous value stored in the accumulator 50. The resultant sum from the adder 46 is provided to the scaler 48, which scales the sum according to a predetermined range of acceptable values. Control of the scaler 48 may be provided by a signal received from the processor 34, or may be based on bits in a control register within the scaler 48 and/or other conventional control methods. The scaled value is then stored in the accumulator. This scaled value is then used for the next addition in the adder 46. When the MAC operation is completed, i.e. all iterations are completed, the final scaled value is stored from the accumulator to a memory location. In this system, if an error is detected in the scaling factor, the entire MAC operation must be recalculated using a new scaling factor.

Figure 9:
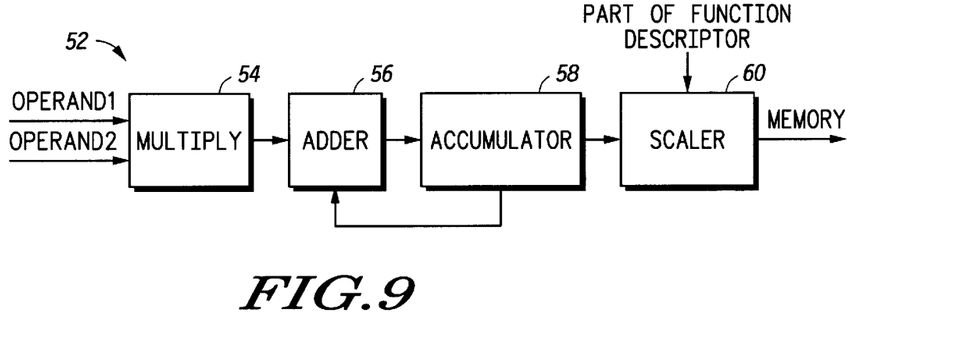
FIG. 9 illustrates, in block diagram form, a MAC unit in accordance with one embodiment of the present invention.

FIG. 9 illustrates a MAC unit according to one embodiment of the present invention, MAC 52. As in FIG. 8, MAC 52 includes a multiply unit 54, an adder 56, an accumulator 58, and a scaler 60. Again operands are provided to the multiply unit 54, which multiplies the two operands and provides the resultant product to the adder 56. The adder 56 receives a value from the accumulator 58, and adds it to the product of the operands. In this embodiment, the resultant sum from the adder 56 is provided directly to the accumulator 58. The accumulator 58 stores the resultant sum from each addition operation of the adder 56. When the MAC operation has completed, a scaled version of the final result stored in the accumulator 58 is provided to a memory location. The scaling is done by scaler 60, which receives the final result from the accumulator 58, and also uses information stored in registers within the registers 36. These registers 36 are detailed further hereinbelow, and generally contain a function descriptor register, a status register and a control register. The status and control registers assist in making decisions regarding the scaling of the final result.

The function descriptor register indicates the number of bits and the location of bits that are to be used to form a scaled result. The number of bits is determined by the capabilities of the data processing system to process data, i.e. the size of data. The location of the bits within the final result balances accuracy and precision. In a fixed-point calculation, the number of bits to the right of the radix point determine the precision, where more bits allows greater precision, and the number of bits to the left of the radix point determines the accuracy, as smaller values require fewer bits and therefore more bits may be used for increased precision. As an example, if the MAC calculation results in the number "00001.001001001" it is possible to represent the number using only two (2) bits to the left of the radix point, a first for the sign bit and a second for the "1." In this case, if the system allows eight bits for the scaled result, the scaled result will be "01.001001" with six (6) bits used for precision. However, if the original number was "00101.001001001" the number requires more bits to the left of the radix point to represent the number. In this case, four bits are required on the left of the radix point, and the scaled result will be "0101.0010" having only four (4) bits for precision. Note that the number of bits included in the scaled result did not change, only the location of the bits with respect to the radix point. The scaling focuses on a predetermined size subset of the final result, which may be located anywhere within the final result but always defines contiguous bits.

In one embodiment of the present invention, the scaler 60 selects a predetermined number of contiguous bits from the final result to form a scaled result. The scaled result includes the number of bits specified in by the function descriptor information, and is located with respect to the radix point as specified in the function descriptor information. The function descriptor information may be referred to as the scaling factor. The function descriptor information is determined based-on arrange of expected values of the final result. If the actual final result is outside the range of expected values, it will overflow when scaled. If the scaled result does not overflow, the scaler 60 outputs the contiguous bits, which may be referred to as a scaled output. If the scaled result overflows, the information stored in the function descriptor register may be changed to rescale the final result and form a new scaled result. In this case, the scaler retrieves the final result from the accumulator 58 and applies the updated function descriptor information to scale the final result to form an updated or corrected scaled result. Note that this may be performed to increase the precision also, when the data is smaller than expected.

The function of the scaler 60 is to select the predetermined bits of the final result. In one embodiment of the present invention, a series of multiplexors (MUXs) is used to select the bits. Each MUX is coupled to a successive contiguous set of bits in the accumulator 58. Each MUX is controlled by the function descriptor information. The selection of a set of bits in the accumulator 58 is then similar to sliding a window across the accumulator 58, where the number of bits and location of bits may be selected and changed.

In one embodiment, the scaler 60 includes a barrel shifter, a priority encoder, a comparator, and selection MUX. The barrel shifter is used to select the subset of bits from the final result for the scaled result. The priority encoder detects the first time a bit value changes, for example from a "0" to a "1" or vice versa. The output of the priority encoder is provided to the comparator, which compares the location of the first bit value change with the location of the selected bits to determine if there is an overflow. If there is no overflow, the comparator controls the selection of the MUX to output the selected subset of bits. On an overflow, the comparator controls the selection MUX to output a saturated value. If the final result is a negative value, the selection MUX outputs a saturated negative value. If the final result is a positive value, the selection MUX outputs a saturated positive value. The comparator also provides an overflow signal to the data processing system 18 indicating the overflow or error.

The data processing system 18 receives the error information and analyzes the operating conditions. The decision to correct the error and adjust the function descriptor information depends on the error and the application. Often errors are small glitches or spikes in the data, and only occur for a few data points. For example, in a video application, the data processing system 18 will often tolerate individual glitches in the data output as the human eye is forgiving of such small errors. Audio applications require stricter control, as a spike in a data point may result in an easily detected and annoying frequency content change.

Figure 10:
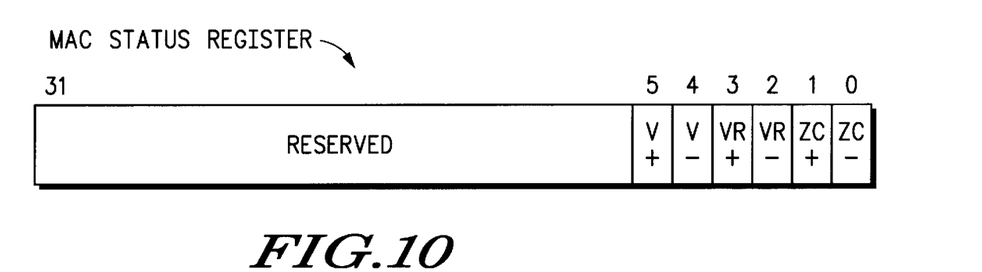
FIGS. 10 and 11 illustrate registers in the MAC unit of FIG. 9 according to one embodiment of the present invention.
Figure 11:
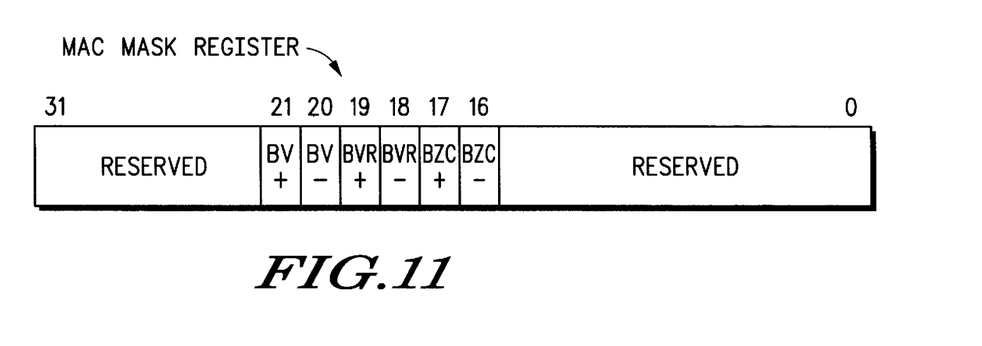

FIGS. 10 and 11 illustrate the status and control registers of registers 36 of FIG. 7. Note that the three registers, registers 36, illustrated in FIG. 7 are provided as exemples to distinguish by operation and significance of the various functions. Alternate embodiments may implement a single register or multiple registers, and may encode the information provided by these registers in alternate forms.

FIG. 10 illustrates a MAC unit status register according to one embodiment of the present invention. Several bits identify the occurrence of various conditions within the data processing system 18. A first set of bits identifies when the final result of a MAC operation has overflowed from the expected range. The "V+" bit indicates saturation at the most positive value. The "V−" bit indicates saturation at the most negative value. A second set of bits identifies when the final result of a MAC operation has overflowed past the radix point. The "VR+" bit indicates overflow in a positive direction, while the "VR−" bit indicates overflow in a negative direction. And a third set of bits identifies when the final result of a MAC operation has changed sign, changing from positive to negative or vice versa. The "ZC+" bit indicates a change from negative to positive, while the "ZC−" bit identifies a change from positive to negative. Each of these bits identifies a status of the final result and is set on occurrence of the indicated condition. Alternate embodiments may include status bits identifying other conditions of the final result.

FIG. 11 illustrates a MAC unit mask register that automates control of MAC 52 on the occurrence of the conditions identified in the MAC status register. Specifically, a breakpoint is set in the task that is currently executing in the MAC 52 on the occurrence of the selected events. The task is suspended and may be restarted after some corrective action is taken. For example, the breakpoint may allow the data processing system 18 to adjust the function descriptor information and then resume the task using this adjusted information. The MAC mask register includes bits corresponding to each of the conditions described in the MAC status register. For example, when the "BV+" bit is set, any overflow out of the expected range of final result values causing a positive saturation will cause a breakpoint. Similarly, when the "BV−" bit is set, any overflow out of the expected range of final result values causing a negative saturation will be treated as a breakpoint. Setting the other bits will result in a breakpoint on occurrence of the associated condition. The bits in the MAC mask register are set and cleared at any time during operation of the data processing system 18, but are typically determined at the initial start up.

Alternate embodiments of the present invention incorporate additional bits in the MAC register of FIG. 11, where the occurrence of predetermined conditions result in other controls. The controls include breakpoint, abortion of the task in the MAC 52, interruption of the processor 34, etc. A similar bit designation may be used for each control. For example, on the occurrence of a condition the task may be aborted assuming a fatal error. Similarly, the occurrence of a condition may interrupt the processor 34, while the task executing in the MAC 52 continues. Alternate embodiments may identify any number of conditions on which a control action is taken. Similarly, a variety of control actions may be implemented, alone or in combination with others.

The present invention provides a method of scaling results from a MAC unit that reduces the time required to correct the result and adjust the scaling factor. This method is applicable to any fixed-point scaling operation, where a multiple step operation is performed yielding a result. The present invention also provides a method of identifying overflows in a MAC unit calculations to prevent further errors from propagating through the data processing system without requiring recalculation of operations already performed. The present invention also provides a method of controlling a data processing system to respond to the occurrence of predetermined conditions. In one embodiment, control and status registers allow the system to monitor operation of the MAC unit and respond accordingly.

In one embodiment of the present invention, the VRI bits provide an early warning that a result may potentially overflow. Also, when calculating the derivative of a function, the zero crossing provides an indication of a change in direction of the data. There are a variety of ways to implement the information provided by such warnings, as well as a variety of ways to produce the corrected data after an overflow does occur. At a breakpoint after an overflow, the DMA does not write the corrected data into memory, but returns from the breakpoint with the uncorrected data still stored in memory. The processor then reads the MAC unit's accumulator and shifts the data appropriately according to the corrected scaling factor. The processor then writes to the function descriptor, specifying the new scaling factor for subsequent MAC operations. At this point, the processor lets the task resume from the breakpoint. In one embodiment, the accumulator value is stored in during a context save. The breakpoint forces saving of the task's context, i.e. all the information necessary to complete the task, including the accumulator value. The context is saved to memory and then may be accessed by the processor at any time. Note that saving the context to memory allows the MAC unit to process other operands without losing the information of the task executing prior to the overflow.

The present invention provides a method of scaling results from a MAC unit that reduces the time required to correct the result and adjust the scaling factor. In one aspect, a method of identifying overflows in the MAC unit calculations helps to prevent further errors from propagating through the data processing system without requiring recalculation of operations already performed.

The present invention provides a method of scaling results from a multiply and accumulate (MAC) unit. In one embodiment, the MAC unit includes a multiplier and an adder to provide a calculated result of a MAC operation. The accumulator stores the calculated result, and a scaler unit selects a subset of the calculated result stored in the accumulator. The scaler unit receives information defining the subset as a predetermined number of contiguous bits and defining the location of the bits with respect to a radix point. In response to a detected error in the selection of the subset, the scaler unit adjusts the subset to select a second subset, where the second subset also has a predetermined number of contiguous bits having a different location with respect to the radix point.

Those skilled in the art will recognize that modifications and variations can be made without departing from the spirit of the invention. Therefore, it is intended that this invention encompass all such variations and modifications as fall within the scope of the appended claims.

What is claimed is:

1. In a data processing system having a processor, a memory coupled to the processor, and a multiply/accumulate (MAC) unit, the MAC unit including an accumulator, a method for operating said MAC unit comprises the steps of:

storing a result of a plurality of MAC operations in the accumulator wherein the plurality of MAC operations is a step in an algorithm;

selecting a first subset of the result wherein the first subset of the result includes a predetermined number of contiguous bits, the first subset of the result defining a first subset value;

storing the first subset value in the memory;

detecting an overflow in the first subset of the result;

retrieving the result from the accumulator; and selecting a second subset of the result different from the first subset of the result wherein the second subset includes the same predetermined number of contiguous bits as the first subset of the result, the second subset of the result defining a second subset value.

2. The method as in claim 1, wherein the step of detecting an overflow further comprising:

detecting when a value of the result in the accumulator is outside a predetermined range of values wherein the predetermined range of values is specified by the first subset of the result.

3. The method as in claim 2, further comprising:

aborting execution of the algorithm when the overflow is detected.

4. The method as in claim 2, further comprising:

continuing execution of the algorithm when the overflow is detected; and generating an interrupt to the processor.

5. The method as in claim 4, further comprising:

saturating the result before continuing execution of the algorithm.

6. The method as in claim 2, further comprising:

pausing execution of the algorithm when the overflow is detected;

generating an interrupt to the processor, wherein the selecting the second subset of the result is performed by the processor in response to the interrupt; and replacing the first subset value stored in the memory with the second subset value in response to the interrupt.

7. The method as in claim 6, further comprising:

continuing execution of the algorithm.

8. The method as in claim 6, wherein, in response to the interrupt, the processor verifies that the interrupt is due to the overflow by checking overflow indicators in a MAC exception register.

* * * * *

UNITED STATES PATENT AND TRADEMARK OFFICE
CERTIFICATE OF CORRECTION

PATENT NO. : 6,581,086 B1
DATED : June 17, 2003
INVENTOR(S) : Gary R. Morrison et al.

It is certified that error appears in the above-identified patent and that said Letters Patent is hereby corrected as shown below:

Column 12,
Line 10, insert -- in response to detecting the overflow, -- before "retrieving the result from the accumulator;".

Signed and Sealed this

Twentieth Day of January, 2004

JON W. DUDAS
*Acting Director of the United States Patent and Trademark Office*